United States Patent [19]
Palmieri et al.

[11] 3,814,910
[45] June 4, 1974

[54] SAILING COMPUTER

[75] Inventors: Frederick W. Palmieri, Santa Monica; John S. Pettingell, Huntington Beach, both of Calif.

[73] Assignee: Computer Equipment Corp., Santa Ana, Calif.

[22] Filed: Aug. 2, 1972

[21] Appl. No.: 277,363

[52] U.S. Cl............................ 235/150.2, 235/150.26
[51] Int. Cl............................................... G06j 7/78
[58] Field of Search....... 235/150.2, 150.26, 150.27, 235/186, 189; 244/77 R, 77 B, 77 D; 343/112 S, 112 C, 112 R

[56] References Cited
UNITED STATES PATENTS

| | | | |
|---|---|---|---|
| 3,007,338 | 11/1961 | Gray et al. | 235/150.27 X |
| 3,532,267 | 10/1970 | Tobin, Jr. | 235/150.2 X |
| 3,657,726 | 4/1972 | Etherington | 235/150.2 |
| 3,676,648 | 7/1972 | Wesner | 235/150.2 X |
| 3,686,626 | 8/1972 | Bateman et al. | 244/770 X |

Primary Examiner—Joseph F. Ruggiero
Attorney, Agent, or Firm—Harris, Kern, Wallen & Tinsley

[57] ABSTRACT

A computer and a method for sailing a boat to windward to obtain maximum velocity made good. A solution algorithm permitting linear relations and a single multiplier in computing velocity made good, with apparent wind speed and angle and boat speed as the data sources.

6 Claims, 3 Drawing Figures

DIRECTION OF TRUE WIND $V_{mg}(B)$ MAX.

$V_{mg}(C)$ $V_S$ $\gamma$ opt.

$V_{mg} = V_S \times \cos \gamma$

SAILING COMPUTER

This invention relates to sailing-to-weather and more particularly, to a method and apparatus for sailing a boat to windward to obtain the maximum velocity along the desired course. It is known that in sailing a boat to windward, there is an optimum heading for the boat at which it moves most efficiently up wind. In the past, skippers have used a knot meter for indicating the boat speed through the water and yarn on the rigging or a wind direction indicator for indicating the direction of wind apparent to the boat and have combined these indications with experience to select a course.

More recently it has been determined that there is an optimum heading at which a sailing boat has the greatest component of speed in the direction of the true wind. The speed or velocity of the boat in the direction of the true wind has been designated the velocity made good $V_{mg}$ and it is now recognized that the velocity made good should be maximized for a sailing boat to achieve maximum performance in sailing to windward. The subject is discussed in "Sailing Theory and Practice" by C. A. Marchaj, Dodd Mead and Co., New York 1964. Marchaj suggested that the wind and boat velocities and angles be measured and that a computer be used to solve the vector equations to provide an indication of the optimum heading for maximum velocity made good. One attempt has been made utilizing an analog computer to obtain a direct solution of the vector equations. This computer required seven multipliers and 28 trimming potentiometers resulting in a very complex arrangement. The error build up through the computer made the arrangement totally unsatisfactory.

Another approach is described in "Sailing To Windward On Instruments" by James M. Fassett II, a paper presented at First Annual Symposium on Sailing, AIAA, Apr. 18, 1970. Fassett starts with the Marchaj determination that the velocity made good to windward should be optimized and calculates graphs of optimum relative wind angle for various boats and wind speeds. The skipper uses the graph to determine the optimum relative wind angle for the particular conditions under which he is sailing and then attempts to maintain this angle at all times.

Neither the Marchaj computer suggestion nor the Fassett charts has been a satisfactory solution and it is an object of the present invention to provide a new and improved sailing computer and method of sailing which will enable the skipper to achieve maximum velocity made good at all times while sailing to windward. A further object is to provide such a computer which will utilize presently available wind speed, wind angle and boat speed measuring devices for inputs to provide an output indication of velocity made good.

It has been found that velocity made good can be continuously computed during operation of a sailing boat utilizing measured wind angle, wind speed and boat speed in an analog computer with a single multiplier and with linear relations throughout to provide a highly accurate indication of velocity made good over the angle of sailing into the wind, typically some 20° to 50° off the wind. It has been found that leeway and heel of the boat can be omitted from the consideration and that linear relations can be substituted for trigonometric relations in the computer. Accordingly it is another object of the invention to provide a sailing computer and a method of sailing for achieving optimum velocity made good to windward incorporating these inventions and discoveries.

Other objects, advantages, features and results will more fully appear in the course of the following description. The drawing merely shows and the description merely describes a preferred embodiment of the present invention which is given by way of illustration or example.

Figure 1:
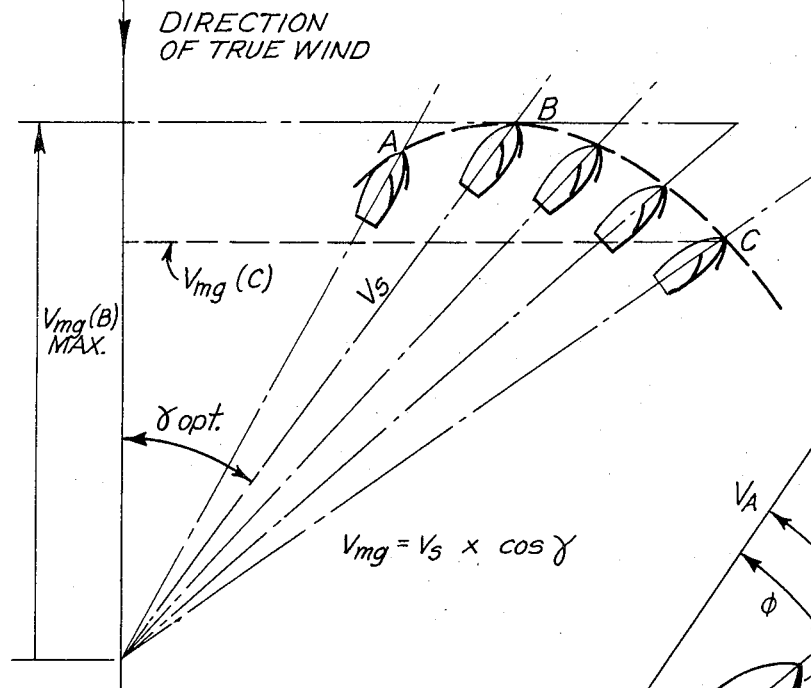
FIG. 1 is a diagram illustrating the relation of boat velocity and course to velocity made good in the direction of the true wind.

TABLE OF SYMBOLS $V_T$ true wind velocity
$V_A$ wind velocity apparent to boat
$V_S$ velocity of boat along course
$V_{mg}$ velocity of boat in direction of true wind
$\beta$ angle between apparent wind and course
$\lambda$ leeway-angle between heading and course
$\theta$ angle between apparent wind and heading
$\gamma$ angle between true wind and course FIG. 1 illustrates the boat speed $V_S$ achieved for various courses and the velocity made good in the direction of the true wind for these courses. It is seen that the boat C has the greatest speed in the water, as indicated by the length of the vector $V_S$. However boat B has the largest component of speed in the direction of the true wind, with $V_{mg}$ being measured along the vertical axis. In this diagram, $V_{mg}$ is equal to the product of $V_S$ and the cosine $\gamma$, the angle between the true wind and the course.

Figure 2:
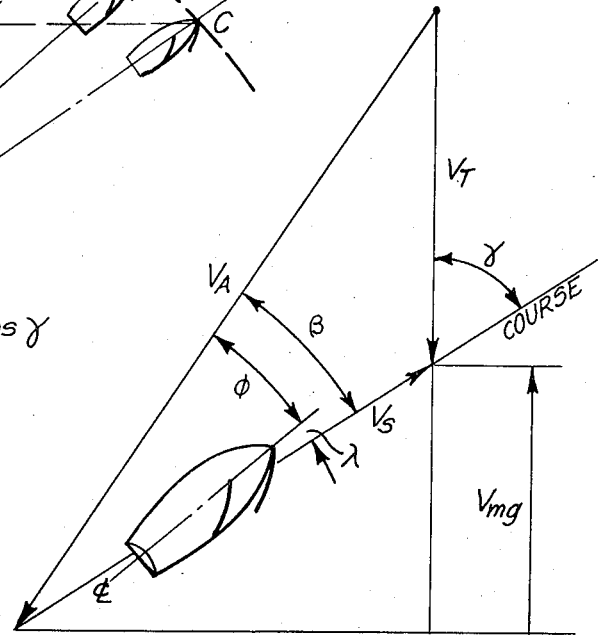
FIG. 2 is a diagram illustrating the velocity vectors and angles for a boat sailing to windward.

The condition of the boat while sailing to windward is illustrated in FIG. 2 with true and apparent wind directions and velocities, boat velocity, leeway and course, and velocity made good in the direction of the true wind. Heel of the boat, which introduces an error in indicated wind direction and wind speed, is another factor.

It has been found that the velocity made good can be calculated very accurately by an approximation to the solution of the vector diagram of FIG. 2 and that this approximation can be instrumented in a relatively simple and inexpensive analog computer. Moree specifically in the present invention, velocity made good is calculated as a linear relation of the apparent wind angle $\phi$, the apparent wind velocity $V_A$ and the boat speed $V_S$. Leeway and heel are ignored, i.e., considered zero, and the cosine relation is treated as a linear relation. A unique solution algorithm for the vector relation is a part of the invention, being $V_{mg} = V_S f(\phi) + K_A V_A$, where $V_S$ is a linear function of $\phi$, and $K_A$ is a constant. More specifically, the preferred solution algorithm is $V_{mg} = V_S (1.36 - 0.25\phi) + 0.05 V_A$. The numerical values may vary ± 5 percent without adversely affecting performance and can be varied as much as ± 10 percent with some loss of accuracy. While the specific values given are preferred for most sailing configurations, it should be recognized that the values may be different for very large boats and/or boats with unusual characteristics.

Figure 3:
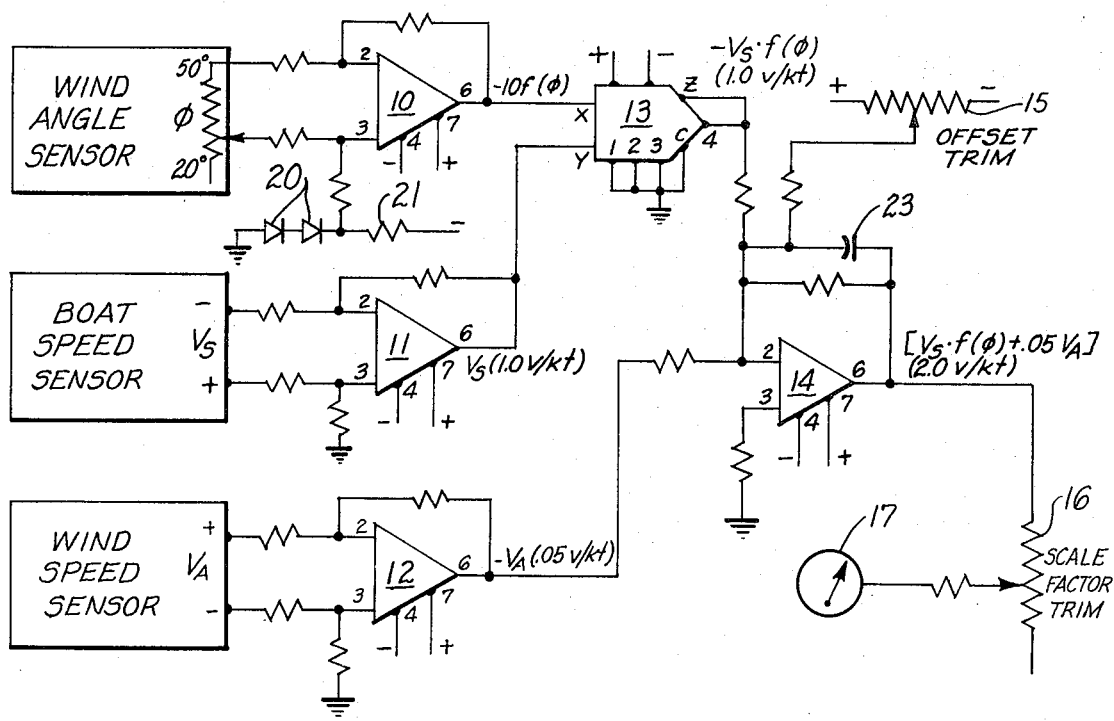
FIG. 3 is an electrical schematic of a sailing computer incorporating the presently preferred embodiment of the invention.

A preferred embodiment for a sailing computer which requires only one multiplier, untrimmed, is set out in FIG. 3.

The computer of FIG. 3 includes three input buffer differential amplifiers 10, 11, 12. The amplifier 10 is operated as a scaling and level shifting amplifier, and the amplifiers 11, 12 are operated as scaling amplifiers. The computer also includes an analog multiplier 13 and a summing amplifier 14. A potentiometer 15 is connected across a voltage source and the output at the moving arm of the potentiometer provides an input to the summing amplifier 14 to provide a trim for offset. Another potentiometer 16 is operated as a variable resistor in the output of the summing amplifier 14 to provide scale factor trim for a velocity made good indicator 17, typically a meter which might be the knot meter indicator of the boat. Conventional sailing boat instruments may be used to provide the inputs to the amplifiers 10, 11, 12, with a wind angle sensor providing input to amplifier 10, a boat speed sensor providing input to amplifier 11, and a wind speed sensor providing input to amplifier 12. By way of example, each of the amplifiers 10, 11, 12 and 14 may be a Fairchild $\mu$A741 integrated circuit operational amplifier and the multiplier 13 may be a Burr-Brown 4094/15C multiplier.

The wind and speed sensors provide input signals which are floating with respect to power ground and the input buffer amplifiers are designed as high input impedance differential input amplifiers. The gain of the amplifier 11 is selected to provide an output of 1.0 volt per knot for the particular boat speed sensor utilized. The gain for the amplifier 12 is selected to provide an output of $-0.05$ volts per knot for the particular wind speed sensor utilized. The amplifier 10 is utilized for level shifting and scaling. The level shift network comprising diodes 20 and resistor 21, and the gain of the amplifier are selected to provide the desired linear function of the wind angle $\phi$, namely $-10f(\phi)$ or $-10(1.36-0.025\phi)$.

The outputs of the amplifiers 10 and 11 are connected as inputs to the multiplier 13 which performs a straightforward analog multiplication of the two inputs, providing an output with a scale factor of 1.0 volts per knot (the X input being divided by 10 in the multiplier). The multiplying operation is achieved without requiring trimming devices for the multiplier.

The amplifier 14 is a conventional inverting operational amplifier operated with a gain of 2 and provides an output scale of 2.0 volts per knot. The output from the multiplier 13 and the output from the amplifier 12 are summed at the input terminal 2. An offset signal from the potentiometer 15 is also summed at this input terminal and provides for trimming of offsets due to the input amplifiers. The potentiometer 16 is used for calibration of the installation and provides for nulling or trimming the scale factor error due to instrument and amplifier errors. The feedback capacitor 23 serves as a damping for the output indicator meter 17.

After installation, the computer is adjusted to provide a null or zero output at the indicator 17 with boat speed and wind speed at zero and the wind angle at a predetermined value, usually 20°, by setting the moving arm of the offset trimming potentiometer 15. The output scale is adjusted for zero error at a predetermined condition, typically an intermediate condition such as 10 knots wind speed, 5 knots boat speed, and 35° wind angle, by adjusting the magnitude of the variable resistor 16 to indicate a specific velocity made good, being 2.44 knots for the specific example given.

In sailing a boat to obtain maximum velocity made good, the helmsman proceeds as follows. First he notes the relative wind direction $\phi$, the wind speed $V_A$ for the present heading, and the velocity made good. Then the helmsman purposely points the boat a few degrees higher by the apparent wind angle sensor and trims the sails to the new heading. This heading is maintained over a period of time sufficient for conditions to become stabilized, typically two minutes. The new velocity made good is noted. It it is higher and the wind speed has not changed by more than about 10 percent, the helmsman can sail the new course or attempt a further optimization. If the new velocity made good is lower, the helmsman then returns to the original heading and/or attempts a course a few degrees lower to determine if an improvement in $V_{mg}$ can be obtained.

It should be noted that while an accurately calibrated computer will provide a direct indication of velocity made good, the boat can be sailed at maximum $V_{mg}$ without knowing the magnitude thereof by selecting a heading which provides a peak or maximum output for the computer.

We claim:

1. A velocity made good computer for a sailing boat having an apparent wind velocity sensor, a boat velocity sensor and a wind angle sensor, including in combination:

a first scaling and level shifting input buffer amplifier;

second and third scaling input buffer amplifiers;

circuit means for connecting the output of the wind angle sensor as an input to said first amplifier;

circuit means for connecting the output of the boat velocity sensor as an input to said second amplifier;

circuit means for connecting the output of the wind velocity sensor as an input to said third amplifier;

an analog multiplier having first and second inputs and an output that is the product of the two inputs;

circuit means connecting the outputs of said first and second amplifiers as inputs to said multiplier;

a fourth summing amplifier;

circuit means connecting the outputs of said multiplier and third amplifier as inputs to said fourth amplifier; and means for connecting the output of said fourth amplifier to a velocity indicator.

2. A computer as defined in claim 1 including offset means for connecting an offset signal as another input to said fourth amplifier, and being variable for adjusting the output of said fourth amplifier to a null condition for predetermined speeds and angle.

3. A computer as defined in claim 2 including a variable resistor connected in series between the output of said fourth amplifier and the velocity indicator for setting the indicated velocity to a predetermined value for predetermined speeds and angle.

4. A computer as defined in claim 1 including a variable resistor connected in series between the output of said fourth amplifier and the velocity indicator for setting the indicated velocity to a predetermined value for predetermined speeds and angle.

5. A computer as defined in claim 1 wherein the scale and level of said amplifiers are selected such that the following relation substantially exists between the outputs of the amplifiers:
third amplifier — 0.05 apparent wind speed $V_A$,
second amplifier — $-1.0$ boat velocity $V_S$, and
first amplifier — $10 \cdot f$ (wind angle $\phi$), where $V_S$ is a linear function of $\phi$.

6. A computer as defined in claim 1 wherein the scale and level of said amplifiers is selected such that the following relation exists between the outputs of the amplifiers:
third amplifier — 0.05 apparent wind speed $V_A$,
second amplifier — $-1.0$ boat velocity $V_S$, and
first amplifier — $10(1.36 - 0.025\phi)$.

* * * * *